No. 833,540. PATENTED OCT. 16, 1906.
H. P. OLSEN.
MILK CLARIFIER.
APPLICATION FILED APR. 28, 1906.
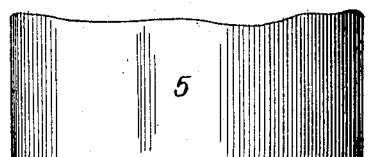
Fig. 1.
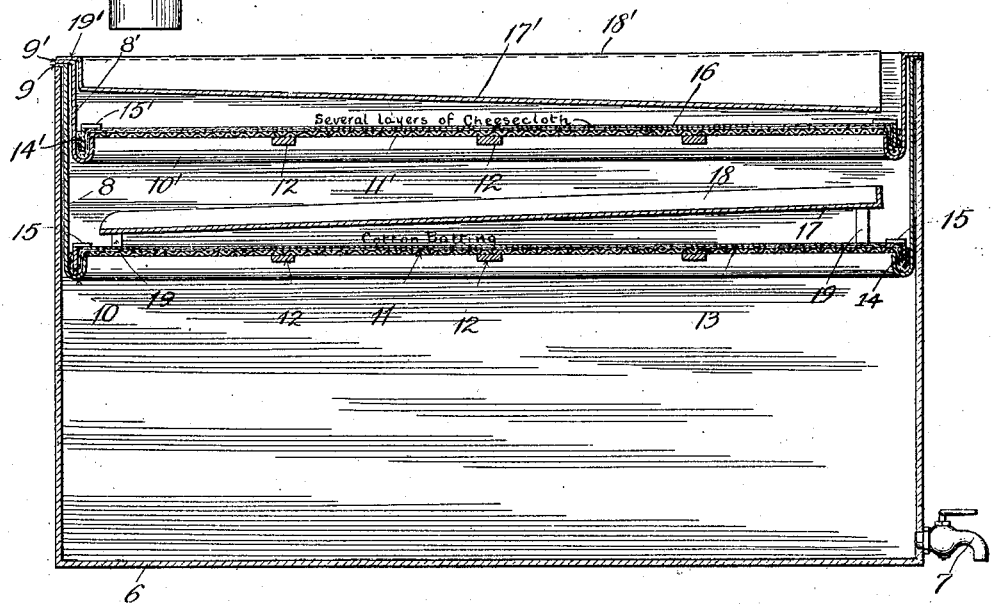
Fig. 2.
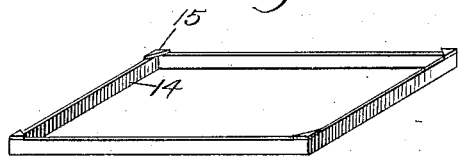
Fig. 3.
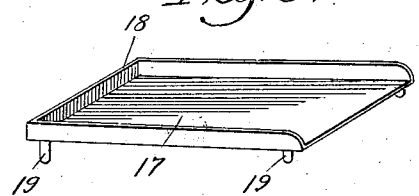
Witnesses
Ray White
Harry R. L. White
Inventor
Hans P. Olsen
By Foree Bain and May
Attys.

UNITED STATES PATENT OFFICE.

HANS P. OLSEN, OF CHICAGO, ILLINOIS.

MILK-CLARIFIER.

No. 833,540.　　　　Specification of Letters Patent.　　　　Patented Oct. 16, 1906.

Application filed April 28, 1906. Serial No. 314,271.

*To all whom it may concern:*

Be it known that I, HANS P. OLSEN, a citizen of the United States, residing at Chicago, in the county of Cook and State of Illinois, have invented certain new and useful Improvements in Milk-Clarifiers, of which the following is a specification.

My invention relates to improvements in milk-clarifying apparatus, and has for its primary object to provide a clarifier or filter for milk which will efficiently extract from the milk in the process of filtration all foreign substances and physical impurities and which will produce no deleterious effects upon the milk undergoing filtration.

Further, it is an object of my invention to provide a milk-filter which will efficiently handle large quantities of milk in a relatively cooled condition without becoming clogged.

Another object of my invention is to provide a device of the general character described wherein the parts are readily accessible and are subject to easy removal and replacement to permit of their proper cleansing and sterilization and subsequent ready assembling.

Yet another object of my invention is to provide a device of the character described wherein means are provided for securing the proper distribution of the milk to the filtering-surfaces and wherein provision is made for the easy renewal of the filter material and its maintenance in proper position while in place in the device.

Other and further objects of my invention will best become apparent to those skilled in the art from the following description, taken in conjunction with the accompanying drawings, wherein—

Figure 1 is a central section taken longitudinally through a device embodying my invention. Fig. 2 is a detail of a filter-material holder. Fig. 3 is a detail of a distributing-tray.

In the drawings, 5 indicates in general a milk-reservoir from which milk is to be fed, and 6 the strained-milk receptacle provided with an outlet, herein represented by the faucet 7. Within the receptacle 6 is arranged the filter proper. The filter preferably consists of two filter-beds in superposed relation, the upper bed being of relatively coarser character and the lower bed being of relatively finer character.

Specifically, 8 indicates the lower filter-bed frame, preferably of sheet-metal construction, of a configuration generally conforming with that of the receptacle 6 and provided at its upper edge with a rim or flange 9, overlying the edge of receptacle 6, and around its lower edge with a gutter 10. Across the opening between the inturned edges of the gutter is stretched a perforate bottom 11, preferably of wire-gauze or other reticulated material, receiving support on suitable slats 12, extending across the frame 8. In preparation of the filter for operation a filter-bed 13, of cotton-batting or like material of very close filtering qualities adapted to catch very fine impurities, is laid upon the reticulated bottom 11, the filter-bed 13 being of greater area than the bottom 11, so that the edges of the bed material overlie the gutter 10. For holding the bed material in place I provide a holder 14 (best illustrated in Fig. 2) of configuration corresponding with that of the gutter 10 and preferably provided at its corners with triangular overlying corner-pieces 15. This frame is preferably of metal and of relatively great weight. It is laid upon the filter material in the manner shown in Fig. 1, and its vertical edges force the filter material down into and wedge it in the gutter 10. The corner-pieces 15, overlying the corners of the filter material, also assist in maintaining said material against movement when the filter is in operation.

Above the lower filter-bed is arranged an upper filter-bed of generally like construction, comprising a frame 8', nesting within the frame 8 and provided with the outturned flange 9', a gutter 10', a reticulated bottom 11', and slats 12', all substantially as described in conjunction with the first-described filter-bed frame. Upon the filter-bed frame 8' is provided a coarser filter-bed 16 in practice preferably made up of a plurality of layers of cheese-cloth or other relatively coarse filtering material. A frame 14', like the frame 14 save only in size, is applied in the manner heretofore described to hold the filter-bed 16 in place.

It will of course be understood that other materials than those specified may be used in the filter-beds, the particular materials being here specified only by way of practical example.

I preferably provide above each of the filter-beds a distributing-tray comprising an inclined metallic sheet whereon the milk coming from above may fall and be fed gently upon the filter-surface therebelow to prevent undue agitation of the milk already upon the filter-surface.

Specifically, 17 indicates a distributing-tray provided with a rail 18 on three sides and open along one end, said tray being provided with feet 19, arranged to incline it slightly toward its open end. This tray 17 is set upon the lower filter-bed 13 in such position as to leave a space between its open edge and the end wall of the frame 8. A tray 17' for similar functions, but preferably comprising rails 18' of gradually-increasing depth along the sides from the closed to the open end and outturned, as at 19', at their upper edges to overlie the flanges 9' of the frame 8', is arranged in a generally similar manner above the filter-bed 16.

It will be seen that the device may be readily taken apart, each part being separable from all the others and susceptible of ready cleansing and sterilizing. The filter material may after each operation of the filter be removed and thoroughly cleansed or destroyed and fresh material inserted for the next operation.

In operation the milk delivered from the reservoir 5 falls upon the tray 17' and flows down in a slow stream upon the filter-bed 16 therebeneath, where it distributes, forming a pool covering the bed, and gradually drips through the filter-bed 16, leaving thereupon and between the cheese-cloth layers the larger foreign particles and impurities. The drops of milk after passing through the filter-bed 16 are caught upon the tray 17 therebeneath and are distributed to the lower filter-bed 13 in like manner. On the lower filter-bed the milk distributes and filters through the material 13, depositing its smaller or finer impurities thereon.

I have found from experience that this construction does not fill up or clog with impurities, and the milk may be handled therein in a cooled condition and in large quantities, probably in virtue of the separation of the impurities upon the two different filter-beds and in virtue, further, to the even and gentle distribution of milk over each filter-bed, whereby massing of the impurities at any one portion of the bed and consequent formation of a clot or clog is prevented.

While I have herein described in some detail a specific embodiment of my invention which I have found to be practical and advantageous of construction, I do not desire to be understood as limiting my invention to the exact construction shown and described further than as specified in the claims, as it will be apparent that numerous changes in the physical embodiment of my invention might be made by those skilled in the art without departure from the spirit and scope thereof.

Having thus described my invention, what I claim, and desire to secure by Letters Patent of the United States, is—

1. In a milk-filter, a receptacle of relatively large area in plan, having arranged therein in superposed relation in horizontal position a plurality of filter-beds, and a tray interposed between said beds and arranged at a slight angle to the horizontal to gently conduct drippings from the upper bed into the lower bed, to conduce to the formation and maintenance of a pool on the second bed with a minimum of agitation of the pool, whereby even distribution of the milk and impurities to the filter-bed is secured.

2. In a milk-filter, a receptacle of relatively large area in plan, having therein in superposed relation an upper filter-bed comprising superposed layers of textile material, and a lower filter-bed comprising a material of finer straining qualities than the upper bed, each of said beds being substantially coextensive with the receptacle, and disposed horizontally, and above each filter-bed a tray, slightly inclined downwardly toward the filter-bed and at its lower end open, and separated somewhat from the end of the casing, substantially as described.

3. In a milk-filter, a receptacle of relatively large area in plan, having therein in superposed relation an upper filter-bed, comprising superposed layers of textile material, and a lower filter-bed comprising a layer of cotton-batting, each of said beds being substantially coextensive with the receptacle, and disposed horizontally, a tray rimmed on three sides arranged above the filter-bed slightly inclined downward toward its open end and approaching the filter-bed, and a second tray rimmed on three sides, arranged above the lower filter-bed, at an opposite inclination, and approaching its filter-bed at its open end.

In testimony whereof I hereunto set my hand in the presence of two witnesses.

HANS P. OLSEN.

In presence of—
 GEO. T. MAY, Jr.,
 MARY F. ALLEN.